United States Patent Office 3,342,834
Patented Sept. 19, 1967

3,342,834
INDOLYL ALKENOIC ACIDS
Tsung-Ying Shen, Westfield, N.J., assignor to Merck & Co., Inc., Rahway, N.J., a corporation of New Jersey
No Drawing. Filed Mar. 2, 1964, Ser. No. 348,839
16 Claims. (Cl. 260—326.12)

This invention relates to new chemical compounds. More particularly, it relates to a new class of compounds of the indole series. Still more particularly, it is concerned with new α-(3-indolyl)-unsaturated lower aliphatic acids having an aromatic carboxylic acyl radical of less than three fused rings attached to the nitrogen atom of the indole ring, and to intermediates for the preparation thereof. It is concerned further with salts, esters, primary amide and anhydride derivatives of such compounds. It relates also to the synthesis of such substances.

This application is a continuation-in-part of application Ser. No. 310,477, filed Sept. 20, 1963, now abandoned, which was a divisional continuation-in-part of application Ser. No. 164,615, filed Jan. 5, 1962, now abandoned, which was a continuation-in-part of application Ser. No. 97,434, filed Mar. 22, 1961, now abandoned, and also a continuation-in-part of application Ser. No. 222,222, filed Sept. 7, 1962, issued to patent under No. 3,242,192 on Mar. 22, 1966.

The new aroyl and heteroaroyl indolyl unsaturated aliphatic acid compounds of this invention have the general structural formula:

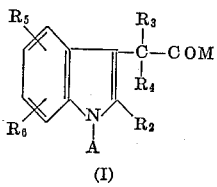

(I)

in which:

A is an aromatic carboxylic acyl radical of less than three fused rings;
$R_2$ may be hydrogen, lower alkenyl, lower alkyl, cycloalkyl, aryl and ar-lower alkyl;
$R_3$ may be lower alkenyl or lower alkynyl; wherein $R_4$ is hydrogen, or the same substituted with halo, lower alkoxy, lower alkylthio or di(lower alkyl)amino groups;
$R_3$ and $R_4$ taken together may be methylene or methylene substituted with lower alkyl, monohalo, dihalo, halo lower alkyl, lower alkoxyalkyl, lower alkylthioalkyl, or dialkylaminoalkyl groups;
$R_5$ may be hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperizinyl, 4-morpholinyl, cyano, amino lower alkyl, trifluoromethyl, halogen, di(lower alkyl)sulfamyl, benzylthio, halogenobenzylthio, benzyloxy lower alkylbenzyloxy, lower alkoxybenzyloxy, halogenobenzyloxy, lower alkenyl, lower alkenyloxy, 1-aza-cyclopropyl, cyclopropylmethyloxy or cyclobutylmethyloxy;
$R_6$ may be hydrogen, lower alkyl, lower alkoxy, fluorine or trifluoromethyl; and
M may be hydroxy, amino, primary amino, lower alkoxy, lower alkenyloxy, aroxy, ar-loweralkoxy, alkaroxy, cycloalkoxy, and lower alkeneoxy, including methoxy, ethoxy, n-butoxy, t-butoxy, ethoxyethoxy, phenoxy, benzyloxy, diphenylmethoxy, triphenylmethoxy, cyclopropoxy, β-diethylaminopropoxy, β-dimethylaminoethoxy, phenethoxy, allyloxy, iso-propoxy, β-N-morpholinoethoxy, cyclopropylmethoxy, and tetrahydrofurfuryloxy; and OY where Y is a cation, or

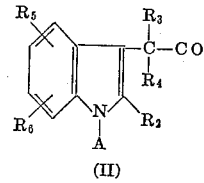

(II)

where $R_2$, $R_3$, $R_4$, $R_5$, $R_6$ and A are as defined above.

The new intermediates used for the preparation of the above compounds have the general structural formula:

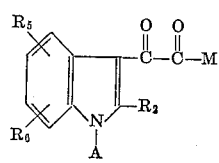

in which $R_2$, $R_5$, $R_6$, A and M are as previously defined (with the exception that M is not such as to form the anhydride).

The following formulas further illustrate the novel compounds of the present invention:

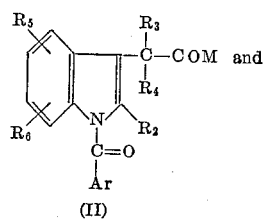 and 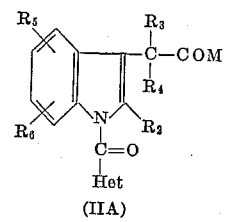

(II)           (IIA)

in which

Ar is an aromatic carboxylic acyl radical (i.e. aroyl) of less than three fused rings;
Het is a hetero-aromatic carboxylic acyl radical (i.e. hetero-aroyl) of less than three fused rings in which the heteroatoms may be O, N or S, all heteroatoms being in one ring and there being no more than three present; and
$R_2$, $R_3$, $R_4$, $R_5$, $R_6$ and M are as defined above.

Accordingly, the compounds of the present invention assume the following structural formulas:

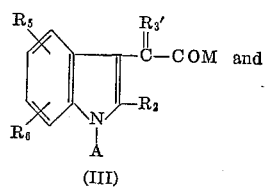 and 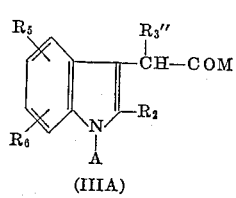

(III)          (IIIA)

where $R_3'$ is methylene and substituted methylene; and
$R_3''$ is lower alkenyl, lower alkynyl, substituted lower alkenyl, and substituted lower alkynyl.

Included among the suitable substituents for methylene are lower alkyl, halogen, haloalkyl, lower alkoxyalkyl, lower alkylthioalkyl and di(lower alkyl)amino lower alkyl; and for lower alkenyl and lower alkynyl groups are halo, lower alkoxy, lower alkylthio and di(lower alkyl)amino, preferably halogen and lower alkyl for $R_3'$ and especially fluoromethylene and dichloromethylene.

In the most preferred form of the present invention, the compounds have the formula below:

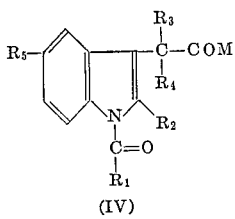

(IV)

in which

R₁ is benzene, napthalene, biphenyl or a substituted benzene, napthalene or biphenyl radical in which the substituents may be halogen, lower alkyl, lower alkylthio, lower alkoxy, trifluoromethyl, phenoxy, lower alkylphenoxy, lower alkoxy phenoxy, halogenophenoxy, trifluoroacetyl, difluoroacetyl, monofluoroacetyl, di(lower alkyl)sulfamyl, lower alkanoyl, di(lower alkyl)carboxamido, cyano, carb-lower alkoxy, aldehyde, trifluoromethylthio, lower alkylsulfinyl, lower alkyl sulfonyl, benzylthio, lower alkylbenzylthio, lower alkoxybenzylthio, halogenobenzylthio, mercapto, nitro, amino, di(lower alkyl)amino, lower alkylamino, lower alkanoylamino, hydroxy, lower alkanoyloxy, trifluoroacetoxy, difluoroacetoxy, monofluoroacetoxy, benzyloxy, lower alkylbenzyloxy, lower alkoxybenzyloxy, and halogenobenzyloxy; and R₂, R₃, R₄, R₅ and M are as defined above.

Alternatively, the N-1 group may be a heteroacyl substituent, and more precisely a heteroaroyl substituent of the formula

where Het represents a five- or six-membered heteroaromatic ring, preferably of less than three fused rings, in which the heteroatom is N, S or O and there is no more than three such heteroatoms in one ring. Examples of such radicals are the furyl, thienyl, pyrryl, thiazolyl, thiadiazolyl, pyrazinyl, pyridyl, pyrazolyl, imidazolyl, oxazolyl, pyrimidinyl and isoxazolyl rings; and benz derivatives thereof, such as benzimidazolyl, quinolinyl and the like.

In the most preferred compounds of the invention, R₅ is a lower alkyl, lower alkoxy, nitro, amino, or substituted amino (especially lower alkylamino and di-loweralkylamino such as methylamino, methylethylamino, dimethylamino, dipropylamino and the like), preferably dimethylamino or methoxy. Examples of the alkyl and alkoxys are methyl, ethyl, propyl, t-butyl, methoxy, ethoxy, iso-propoxy and the like. R₅ is not limited to this class of substituents, however, and may, if desired, also represent hydrogen or aryl or aryloxy substituents such as benzyloxy, hydroxy, mercapto, haloalkyl such as CF₃, CHF₂ or other haloloweralkyls, loweralkylamino, acylamino, cyano, sulfamyl, sulfoxide, aminomethyl, substituted aminomethyl such as methylaminomethyl and dimethylaminomethyl, carboxy, N,N-diloweralkylcarbamyl and carboloweralkoxy groups.

A critical feature of the new compounds described herein is the presence of an aroyl or hetero-aroyl radical attached to the N-1 position of the indole. These β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide, and the like, or an aldehyde derivative of the type represented by acetals or thioacetals. In the preferred compounds, the N-1 aroyl radical is benzoyl and the functional substituent is in the para position of the six-membered ring.

Acyl groups may be further substituted in the aromatic ring with hydrocarbon groups or with functional substituents. Thus suitable aroyl substituents are the benzyl, phenylbenzoyl and naphthoyl groups. The aromatic rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, propoxy, an alkenyloxy such as allyloxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The preferred aroyls, therefore, are p-loweralkylthiobenzoyl and p-halobenzoyl, especially p-methylthiobenzoyl and p-chlorobenzoyl. The N-1 aroyl radical may, if desired, be haloalkylated, as with a trifluoromethyl, trifluoroethyl, perfluoroethyl.

The α-(3-indolyl)unsaturated aliphatic acids described herein are preferably unsaturated lower aliphatic acids such as α-(3-indolyl)derivatives of acrylic, crotonic, pent-2-enoic, hex-2-enoic, 3-methyl-pent-2-enoic, α-allyl-acetic, α-methallylacetic, and like acids. Lower alkyl esters, salts, amides and the anhydrides of such unsaturated aliphatic acids represent an additional aspect of the invention. The esters are important intermediates in the synthesis of the free acids, and in many cases are themselves of importance as end products. The preferred esters are the lower alkyl esters such as the methyl, ethyl, propyl or t-butyl compounds and the benzyl, p-halobenzyl and like esters.

The salts of these new α-(1-aroyl or heteroaroyl-3-indolyl)-unsaturated lower aliphatic acids can be obtained by treatment of the free acid with base under mild conditions. In this manner there may be obtained alkaline metal salts such as the sodium and potassium, the aluminum or magnesium salts or salts of alkaline earth metals, examples of which are barium and calcium. The primary amides included within this invention are conveniently synthesized by first preparing the amide of an α-(3-indolyl)-unsaturated lower aliphatic acid unsubstituted at the 1-position and then acylating said compound by the process described hereinbelow. Such amides are conveniently obtained by treating the appropriate acid chloride with ammonia.

The 2-position of the indole ring nucleus (R₂ in the above formula) may be hydrogen although it is preferred that there be present at this position of the molecule a hydrocarbon radical having less than nine carbon atoms. Lower alkyl groups such as methyl, ethyl, propyl or butyl are the most satisfactory, but lower alkenyl radicals also can be used. The intermediate glyoxalic compounds of this invention have as their preferred substituents those that have been previously indicated for compound (IV).

The following compounds are representative of those contemplated by this invention and which may be prepared by the procedure discussed hereinbelow:

Methyl-α-(1-p-chlorobenzoyl-2-methyl-5-methoxy-3-indolyl)-acrylate, methyl-α-(1-p-chlorobenzoyl-2,5-dimethyl-3-indolyl)-acrylate, methyl-α-(1-p-methylthiobenzoyl-2-methyl-5-methoxy-3-indolyl)-crotonate, α-(1-p-chlorobenzoyl-2-methyl-5-methoxy-3-indolyl)-crotonic acid,
2-(1-p-chlorobenzoyl-2-methyl-5-methoxy-3-indolyl)-pent-2-enoamide,
2-(1-benzoyl-2-methyl-5-methoxy-3-indolyl)-pent-2-enoamide,
ethyl-2-[1-(2,4-dichlorobenzoyl)-2-methyl-5-methoxy-3-indolyl]-hex-2-enoate,
methyl-2-[1-(2'-thenoyl)-2-methyl-5-methoxy-3-indolyl-3-methylpent-2-enoate,
benzyl-[1-(4'-thiazolyl)-2-ethyl-5-methyl-3-indolyl]-β-methylcrotonate,
benzyl-2-[1-(2'-furoyl)-2,5-dimethyl-3-indolyl]-propyl-2-[1-(nicotinoyl)-2-methyl-5-methoxy-3-indolyl]-5-chloro-pent-2-enoate,
benzyl-2-[1-(naphthoyl)-2-methyl-5-methoxy-3-indolyl]-5-fluoro-pent-2-enoate,
2-[1-(4'-thiazolyl)-2-methyl-5-methoxy-3-indolyl]-crotonamide,
methyl-2-(1-p-chlorobenzoyl-2-methyl-5-methoxy-3-indolyl)-6,6,6-trifluorohex-2-enoate,
methyl-α-(1-p-chlorobenzoyl-2,5-dimethyl-3-indolyl)-α-allyl-acetate,
methyl-α-(1-p-methylthiobenzoyl-2-methyl-5-methoxy-3-indolyl)-α-methallyl-acetate,
α-(1-p-chlorobenzoyl-2-methyl-5-methoxy-3-indolyl)-α-crotyl acetic acid,
α-(1-p-chlorobenzoyl-2-methyl-5-methoxy-3-indolyl)-α-propargyl-acetamide,
α-(1-benzoyl-2-methyl-5-methoxy-3-indolyl),
α-(4-methoxycrotyl)-acetamide,
ethyl-α-[1-(2,4-dichlorobenzoyl)-2-methyl-5-methoxy-3-indolyl]-α-(4-methoxycrotyl)-acetate,
benzyl-α-[1-naphthoyl)-2-methyl-5-methoxy-3-indolyl]-α-(4-trifluoromethylcrotyl)-acetate,
methyl-α-(1-p-chlorobenzoyl-2-methyl-5-methoxy-3-indolyl)-glyoxalate,
methyl-α-(1-p-methylthiobenzoyl-2-methyl-5-methoxy-3-indolyl)-glyoxalate,
methyl-α-(1-p-chlorobenzoyl-2,5-dimethyl-3-indolyl)-glyoxalate,
ethyl-[1-(naphthoyl)-2-methyl-5-methoxy-3-indolyl]-glyoxalate,
(1-p-chlorobenzoyl-2-methyl-5-methoxy-3-indolyl)-glyoxalic acid,
(1-p-methylthiobenzoyl-2-methyl-5-methoxy-3-indolyl)-glyoxalamide,
Na-(1-p-chlorobenzoyl-2-methyl-5-methoxy-3-indolyl)-glyoxalate,
benzyl-[1-(4'-thiazolyl)-2-ethyl-5-methyl-3-indolyl]-glyoxalate, and the like.

The intermediate glyoxalate compounds of this invention (Flow Sheet I) may be prepared by reacting an oxalyl halide (preferably the chloride) with indole itself or a substituted indole. The 3-indoleglyoxalyl halide compound thus formed may then be converted to the indoleglyoxalylamide or substituted amide by reaction with ammonia or a primary amine or secondary amine. The ester may be prepared by reacting the 3-indoleglyoxalyl halide with lower alkyl alcohol or ar-lower alkanol; the acid may be prepared by reacting the 3-indoleglyoxalyl halide with water and the alkali metal salt may be prepared by reacting the 3-indoleglyoxalyl halide with an alkali base. The acylation is then carried out on the glyoxal amide, ester, or alkali salt to produce the intermediate N-1 substituted 3-indoleglyoxal compound. In those cases where the free acid is desired, it is preferred to carry out the acylation at the initial step of the synthesis.

In carrying out the process for the preparation of the 3-indoleglyoxalyl halide, 1,3-unsubstituted indoles are reacted with an oxalyl halide (preferably chloride) in the presence of an inert organic solvent such as ether, petroleum ether, methylcyclohexane, dioxan, and the like (ether preferred). Stoichiometric quantities are preferably employed, although variations in quantities may be employed with subsequent yield changes. The reaction is preferably conducted at ambient temperatures, although temperatures between 10 and the boiling point of the solvent can be employed. The reaction is generally completed between 15 minutes and 8 hours, longer periods being required where lower reaction temperatures and/or less reactive indoles are used. After reaction, the mixture is cooled to about 0° C. whereupon the 3-indoleglyoxalyl halide can be recovered by filtration.

In the preparation of the 3-indoleglyoxalylamide intermediate, the 3-indoleglyoxalyl halide is reacted with ammonia or a primary or secondary amine to form the desired amide. Examples of the amines that may be used are: ammonia, mono-lower alkylamine (methylamine, propylamine and the like), di-lower alkylamine (dimethylamine, dipropylamine, methylethylamine and the like), and ar-lower alkylamine and ar-lower alkyl-lower alkylamine (benzylamine, benzylmethylamine, benzylpropylamine, phenethylethylamine, phenethylamine, phenylmethylamine, phenylpropylamine, phenylethylamine and the like). The mono- and di-lower alkylamines are preferred, especially methylamine and dimethylamine. The amidation reaction is preferably carried out at ambient temperatures, although a temperature between about 0° and 100° may be used. This reaction is usually completed between ½ hour to 5 hours, the longer reaction time being required at lower temperatures. The reaction may be carried out in inert solvents such as aliphatic hydrocarbons, aromatic hydrocarbons, ketones, and ethers (benzene preferred) but the reaction can also be carried out without a solvent. The amide thus formed is acylated to yield one of the variety of intermediates.

The preparation of the ester intermediate may be conveniently carried out by reacting the 3-indoleglyoxalyl halide with a lower alkanol or ar-lower alkanol. The alcohol is normally used as the solvent also. The reaction is normally carried out at ambient temperatures. However, temperatures of zero to the boiling point of the solvent may be used. The reaction time depends on the reactants and temperature of the system. The lower alkanol employed may be methyl alcohol, ethyl alcohol, propyl alcohol, benzyl alcohol, phenylethanol and the like, preferably benzyl alcohol, t-butanol, or ethyl alcohol, but especially ethyl alcohol or t-butanol. The ester thus formed is acylated to yield another of the various intermediates.

The preparation of the glyoxalic acid intermediate is carried out using water and the reaction conditions are similar to those employed in the preparation of the ester. (Here acylation is carried out first.) In addition, the preparation of the alkali metal salt of the glyoxalic acid intermediate such as sodium or potassium salt (sodium preferred) may also be prepared under the same conditions as the preparation of the ester intermediate employing such bases as aqueous sodium hydroxide, potassium hydroxide, sodium carbonate, potassium carbonate, sodium bicarbonate and potassium bicarbonate in place of the alcohol as in the ester preparation.

In those cases where the substituent on the glyoxalic portion of the molecule is to contain an active hydrogen such as in the case of the glyoxalic acid, it is highly preferred that the acylation be carried out at the initial stage of the synthesis. When this is not done the acylation will take place not only at the N-1 nitrogen but also at the other active hydrogen sight. With the other indole glyoxalic compounds such as the amide, ester and alkali salt, acylation may be carried out at the indole stage or preferably after the glyoxalic compound has been formed. The procedure and reaction conditions for the acylation are the same as those described infra column 8, line 73 through column 9, line 27.

FLOW SHEET I

*Preparation of intermediates*

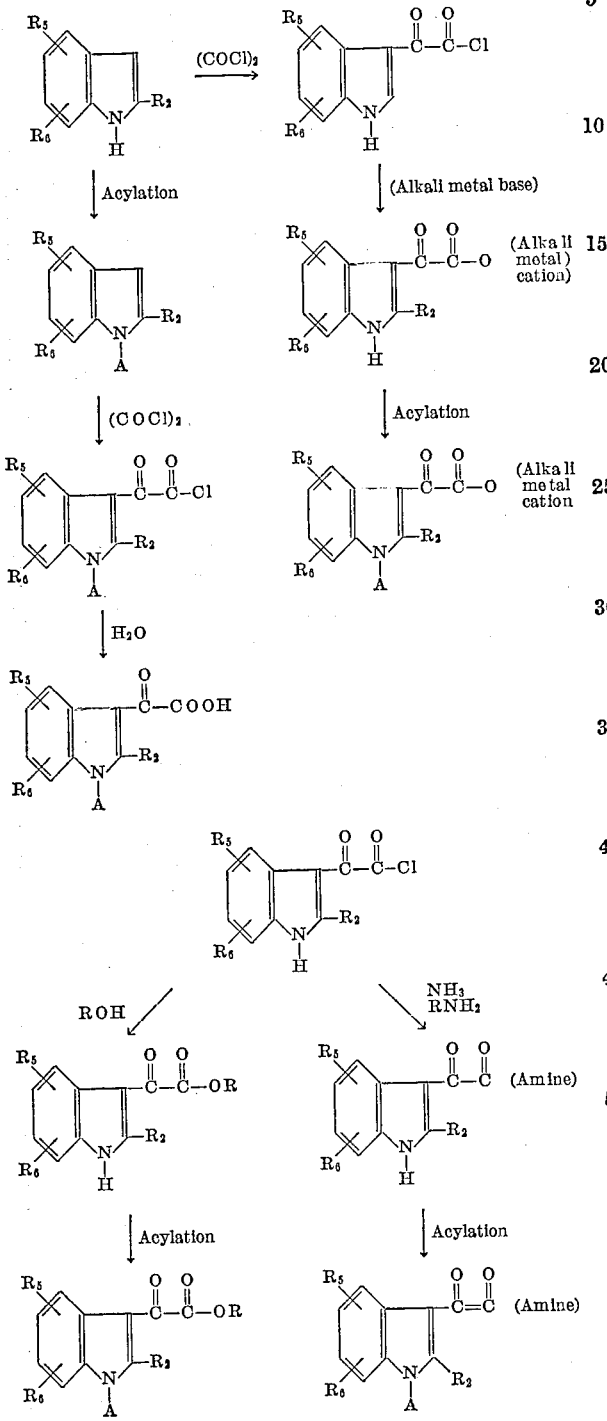

Equivalents:
  $R_2$, $R_5$, and $R_6$ as previously defined;
  Alkali metal cation=Na, K;
  R=lower alkyl or ar-lower alkyl (preferably benzyl, methyl or ethyl), especially ethyl.

The final compounds of the present invention where there is a double bond directly attached to the α-carbon atom of the 3-indolyl acetate (i.e., compound of Formula III) are prepared according to the process described in the Flow Sheet II.

FLOW SHEET II

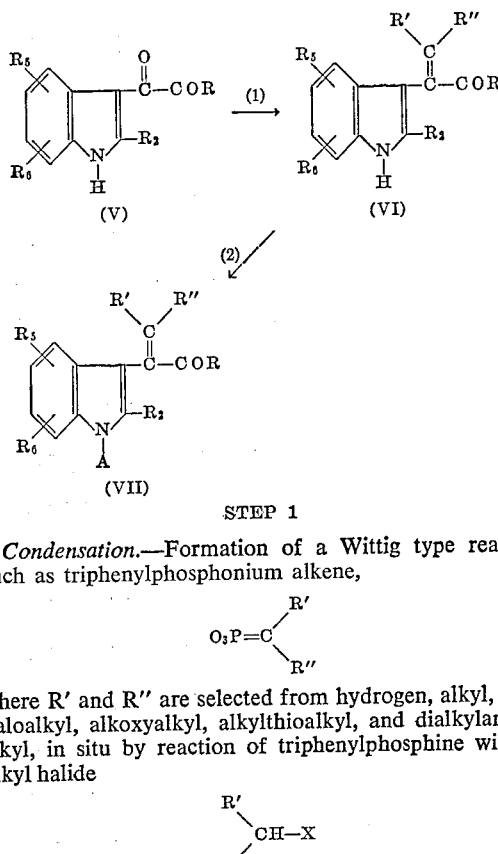

STEP 1

*Condensation.*—Formation of a Wittig type reagent, such as triphenylphosphonium alkene,

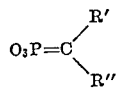

where R' and R'' are selected from hydrogen, alkyl, halo, haloalkyl, alkoxyalkyl, alkylthioalkyl, and dialkylaminoalkyl, in situ by reaction of triphenylphosphine with an alkyl halide

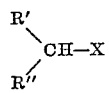

preferably the bromide, followed by the treatment of a strong base, such as n-butyl lithium, in an inert solvent, such as ether. [In those cases where R' and R'' are selected from the group consisting of hydrogen and halogen, the Wittig reaction may be run using the triphenylphosphine halomethylenes prepared according to the procedure of D. Seyferth et al., J. Am. Chem. Soc. 82 1511 (1960).] Reaction of this reagent with the glyoxyl compound, preferably the glyoxalate or glyoxalamide, in an inert solvent. (—COR is an ester or amide group.)

STEP 2

*Acylation.*—To form the 1-aroyl or 1-hetero-aroyl compound as described in the text. (A is as defined above.)

The Wittig reaction (Step 1) provides a conversion of the keto group of the glyoxalate or glyoxalamide (V) into a carbon to carbon double bond, to produce the unsaturated ester or amide (VI). Two typical runs are as follows: (1) methyl-α-(2-methyl-5-methoxy-3-indolyl)-glyoxalate (V: $R_2$=methyl, $R_5$=methoxy, $R_6$=H, R=methoxy) is condensed with the Wittig reagent obtained from methyltriphenylphosphonium bromide to form methyl-α-(2-methyl-5-methoxy-3-indolyl) - acrylate (VI: $R_2$=methyl, $R_5$=methoxy, $R_6$=H, R=methoxy, R'= R''=H); (2) methyl-α-(2-methyl-5-methoxy-3-indolyl)-glyoxalate is condensed with the Wittig type reagent (triphenylphosphinehalomethylene) to form methyl-α-halomethylenyl - α - (2-methyl-5-methoxy-3-indolyl)-acetate.

In accordance with the invention, Wittig reagents other than the methyltriphenylphosphonium bromide, also may be employed for introduction of the desired carbon to carbon double bond at the alpha carbon atom. These are also described in detail in Annual Reports of the Chemical Society, col. LVIII (1961), pp. 203–204.

It is preferred to carry out the acylation (Step 2) on an ester or amide derivative of the lower aliphatic acid. In those cases where the free acid is desired, the ester or amide may then be converted under suitable reaction conditions to the free acid. It has been observed that the 1-aroyl or 1-hetero-aroyl substituent is easily hydrolyzed under conditions normally employed for saponification of an ester to the free acid. For this reason, care must be taken in converting the α-(1-aroyl or 1-hetero-aroyl-3-indolyl)-unsaturated lower aliphatic acid esters to the corresponding free acids. It has been found that one convenient method of accomplishing this conversion comprises acylation of the benzyl ester and subsequent hydrogenolytic removal of the benzyl ester. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent.

The acylation reaction is preferably conducted by treating the α-(3-indolyl)-unsaturated lower aliphatic acid starting material with an alkali metal hydride, such as sodium hydride, to form e.g. a sodium salt and then intimately contacting said salt with an aroyl or hetero-aroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

While Flow Sheet II shows the acylation step is carried out at the end of the synthesis, it will be understood that the acylation can be performed on the starting material V, followed by condensation of the acylated intermediate with a Wittig reagent, or the indole used to prepare the starting material may first be acylated in the N-1 position with the aroyl or hetero-aroyl moiety followed by the introduction of the ketoester moiety in the 3 position, which may then be condensed with a Wittig reagent.

An alternative method of acylating the 1-position is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-unsaturated lower aliphatic acid starting material is achieved by forming a sodium salt of said material with sodium hydride in an anhydrous solvent and adding the nitrophenyl ester. In a typical run methyl 2-(1-p-methylthiobenzoyl-2-methyl-5-methoxy-3-indolyl)-acrylate (VII: $R_2$=methoxy, $R_6$=H, R=methoxy, R'=R''=H, A=p-methylthiobenzoyl) is prepared from the intermediate prepared above upon reaction with p-methylthiobenzoyl chloride.

The α-(1-aroyl or heteroaroyl-3-indolyl)-unsaturated lower aliphatic acid compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic and analgesic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–2000 mg. per day are useful in control of arthritic conditions, depending on the activity of the specific compound and the reaction sensitivity of the patient.

A method for providing indolyl unsaturated lower aliphatic acids where the unsaturated bond is present in a position other than at the alpha carbon atom of the 3-indolyl acetate (i.e. compounds of the Formula III–A) is illustrated in Flow Sheet III.

FLOW SHEET III

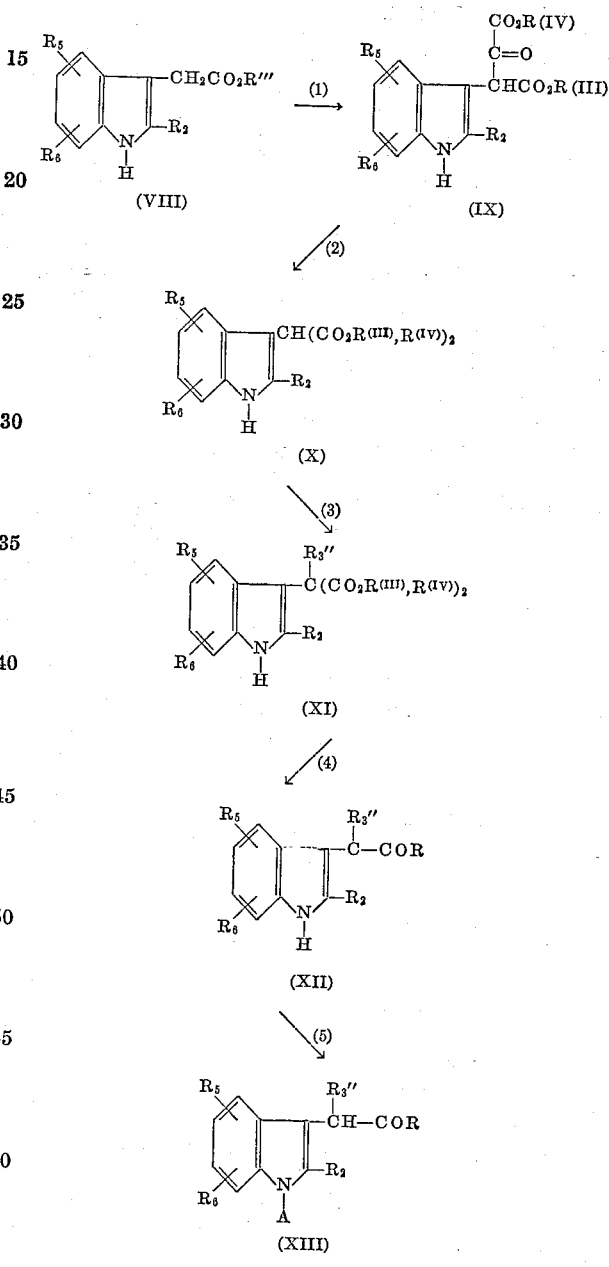

STEP 1

*Condensation.*—α-(3-indolyl)-acetate with diloweralkyl oxalate, with a strong base, e.g., NaH, in an inert solvent, e.g., benzene, at elevated temperatures, e.g., at 80°. (R–III and R–IV are lower alkyl, preferably the same group.)

STEP 2

*Pyrolysis.*—Elevated temperature, e.g., 100–200° in presence of powdered glass (loss of CO).

STEP 3

*Alkylation.*—R″₃X as alkylating agent, R″₃ is lower alkenyl or lower alkynyl or substituted derivatives thereof, such as with halo, alkoxy, alkylthio and dialkylamino, and X is a halogen, in a solvent in presence of base.

STEP 4

(a) Hydrolysis and decarboxylation of substituted malonic ester—as is well known in the art.

(b) Esterification or amidation of α-substituted α-(3-indolyl)-acetic acid. (—COR is an ester or amide.)

STEP 5

*Acylation.*—See text.

The first step in the process according to Flow Sheet III is a condensation of an α-(3-indolyl)-acetate with a diloweralkyl oxalate in the presence of a strong base in an inert solvent at elevated temperatures to form the corresponding 2-oxalyl acetate. In a typical run, methyl-α-(2-methyl-3-indolyl)-acetate (VIII, $R_2$=methyl, $R_5$=$R_6$=$H_2$ and R‴=methyl) is condensed with dimethyl oxalate to produce the intermediate dimethyl-2-(2-methyl-3-indolyl) oxalyl acetate (IX: $R_2$=methyl, $R_5$=$R_6$=H, R‴=methyl and $R^{IV}$=methyl).

The next step in the process is to convert the intermediate IX to the corresponding malonate X by the loss of carbon monoxide. The step is effected by heating IX in the presence of a solid material having a large surface area, such as powdered glass. There is thus produced the corresponding dimethyl-(2-methyl-3-indolyl) malonate (X: R‴=$R^{IV}$=methyl) $R_5$=$R_6$=H and $R_2$=methyl.

Following the pyrolysis step, the malonate is alkylated to introduce the desired R″₃ group at the alpha carbon. This step is particularly advantageous in the sequence to introduce R″₃ groups having the unsaturated removed from the α-carbon. Alkylation can be carried out in a manner well known for the alkylation of malonates in general. In a typical run, dimethyl-(2-methyl-3-indolyl) malonate is reacted with allyl bromide, to produce the corresponding dimethyl-α-allyl-α-(2-methyl-3-indolyl)-acetate (X: R‴=$R^{IV}$=methyl, R″₃=allyl and $R_5$=$R_6$=H).

The fourth step in the process involves hydrolysis and decarboxylation of the substituted malonic ester, followed by esterification or amidation to produce the corresponding α-R″₃ substituted α-(3-indolyl)-acetate (for example, methyl-α-allyl-α-(2-methyl-3-indolyl)-acetate (XII: $R_5$=$R_6$=H, $R_2$=methyl, R″₃=allyl, and R=methoxy).

Finally, the intermediate XII is acylated as before to produce the desired final product XIII; e.g. methyl 1-p-methylthiobenzoyl-α-allyl-α-(2-methyl-3-indolyl)-acetate (XII: $R_5$=$R_6$=H, $R_2$=methyl, R″₃=allyl, R=methoxy, and Z=p-methylthiobenzoyl).

The α-3-(indolyl)-aliphatic ester compounds employed as starting material in Flow Sheet III discussed above, may be synthesized in various ways. When $R_2$ is hydrogen or methyl, it is preferred to form such compounds by reacting together an appropriately substituted phenylhydrazine and a levulinic ester to form an intermediate phenylhydrazone which cyclizes under the reaction conditions to the indole compound.

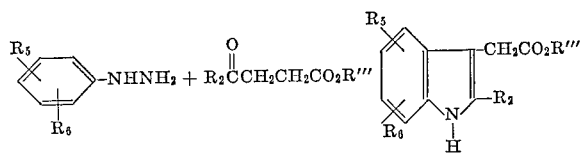

where R‴, $R_5$ and $R_6$ are as above. The reaction is normally carried out in a lower alkanol such as methanol, ethanol, isopropanol or butanol containing an acid such as hydrochloric, sulfuric or acetic acid or in aqueous mineral acid such as concentrated hydrochloric, phosphoric, sulfuric, or acetic acid, or other Lewis acid such as $ZnCl_2$, $BF_3$, $SnCl_4$, polyphosphoric acid and the like.

The acid serves as a catalyst in the condensation and ring closure reactions leading to the 1-unsubstituted indole. The nature of the ester is not critical, although it is preferred to utilize a lower alkyl ester, e.g., the methyl, ethyl, propyl, isobutyl or isopropyl compound. To avoid the possibility of transesterification, the alcohol used as the solvent medium is preferably the same as the alcohol moiety of the ester. When $R_2$ is hydrogen, it is convenient to employ the aldehyde in the form of an acetal, e.g., methyl, γ,γ-dimethoxy butyrate. An acid addition salt of the phenylhydrazine reactant, for example, the hydrochloride, is normally preferred over the free base for practical reasons, although such salts and the base are equivalent in the reaction itself.

Formation of the α-(3-indolyl)-aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the 1-unsubstituted esters are low melting solids, they are conveniently purified by distillation under reduced pressure. They are saponified by treatment with an alkali metal hydroxide.

The substituted phenylhydrazines employed as one of the starting materials in the synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

The 1-acyl group in α-(1-acyl-3-indolyl)-unsaturated lower aliphatic acids and esters of this invention are, as has been mentioned earlier, easily hydrolyzed under the conditions normally used to saponify an ester. For this reason, the benzyl ester of the intermediate α-(1-unsubstituted-3-indolyl) acids are a convenient starting material. These are obtained by forming the free α-(1-unsubstituted-3-indolyl)-unsaturated aliphatic acid and esterifying this with benzyl alcohol in an inert solvent with an acid catalyst (sulfuric, aryl sulfonic acids, etc.). Alternatively, the intermediate benzyl ester is synthesized directly by using the benzyl ester of the proper levulinic acid in the original synthesis of the indole ring, or is formed by base catalyzed ester exchange from other esters. After acylation of the indole nitrogen of these benzyl ester intermediates, the benzyl group can be removed clearly by hydrogenolysis, a process which leaves the 1-acyl group untouched.

Alternatively, it is possible to first produce an indole of the formula:

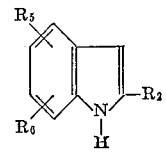

where $R_2$, $R_5$ and $R_6$ have the same meaning as before, and then to introduce the carboxylic acid residue at the 3-position. This is accomplished by treating the indole of the above formula under Mannich reaction conditions with formaldehydedialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2- propyl, 2-allyl and like substances. Compounds of the above formula, unsubstituted in the 3-position, are readily prepared following the procedures set forth in columns 2 and 3 of U.S. Patent No. 2,825,734. Products where $R_5$ is acyloxy, halo, cyano, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having a 5-indole ring substituent which has a nitrogen attached to the aromatic homocyclic ring of the indole is generally based on the 5-nitro compound. This is transformed into the desired 5-substituent. Such transformation may be made before or after aroylation or hetero-aroylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Suitably nitration can be effected on an n,n-dialkyl substituted amide of the indole followed by acylation. Reduction of the 6-nitro group gives a 5-amino group. Reaction of the amino with alkyl halides gives mono and dialkyl amino groups. If the alkyl halide is a dihaloakylene group (e.g., 1,4-dibromobutane) a heterocyclic ring (e.g., pyrrolidino) is formed. Similarly, bis($\beta$-chlorethyl)ether will give an N-morpholino compound. Alkylation can also be carried out simultaneous with reduction, as e.g., with formaldehyde and Raney nickel and hydrogen. Acylation can similarly be carried out on the 6-amino compounds or on the 6-nitro (with simultaneous reduction) to give 6-acylamido compounds. The 6-amino group can be reacted with isocyanates to give 6-ureido compounds.

Compounds where $R_5$ is OH are prepared by starting with an indole where $R_5$ is benzyloxy and reducing the final compound substituted with a benzyloxy group to produce the corresponding hydroxy substituted compound according to the procedure in U.S. Patent 2,825,734.

Where the aroylation or hetero-aroylation ester or amide itself is desired as a final compound, the acid may be directly converted to the desired ester in a variety of reaction sequences, as for example, by formation of the acyl chloride and reaction with alcohol or direct reaction with alcohol, or with diazomethane or a substituted diazomethane, or in other ways known in the art, and this ester aroylated or hetero-aroylated in the manner described above. This technique is particularly advantageous for those esters and amides which do not contain an active hydrogen as, for example, the methyl ester, the diethylaminoethyl ester, and the morpholinyl amide. On the other hand, aroylation or hetero-aroylation of esters and amides which contain an active hydrogen in the ester or amide moiety, as, for example, the carboxamide or the hydroxyethylcarboxamide, is carried out, for example, on the tertiary butyl ester which is then pyrolyzed to form the acid. Esterification or amidation then can be performed on the aroylated or hetero-aroylated acid.

The following examples are given by way of illustration:

EXAMPLE 1

*Ethyl-2-(p-methylthiobenzoyl-2-methyl-5-methoxy-3-indolyl)-acrylate*

A. ETHYL-$\alpha$-(2-METHYL-5-METHOXY-3-INDOLYL)-ACRYLATE (1) 500 ml. of dry ether, 36.02 g. of methyltriphenylphosphonium bromide, made from equivalent amounts of triphenylphosphine and methyl bromide, and 94.36 ml. of 1.10 N n-butyl lithium are stirred for one hour at room temperature under nitrogen.

(2) 38 g. of ethyl-(2-methyl-5-methoxy-3-indolyl)-glyoxalate in 260 ml. of benzene and 500 ml. of dry ether are added, and stirring continued for one hour. The reaction mixture then is transferred to a pressure flask and heated in a closed flask at 65–70° C. for five hours. The liquid is poured from the pressure flask and the gum triturated with 500 ml. of 33% benzene in ether. The solutions are combined and washed with three 500 ml. portions of water, dried over sodium sulfate, filtered and concentrated in vacuo to a syrup. The syrup is slurried in benzene and charged onto a 200 g. column of activated alumina. Ethyl-$\alpha$-(2-methyl-5-methoxy-3-indolyl)-acrylate is eluted by washing the column with 30% ether in petroleum ether and removing the eluting solvents by evaporation.

B

A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl-$\alpha$-(2-methyl-5-methoxy-3-indolyl)-acrylate is added and the mixture stirred for 20 minutes. 8.6 g. (0.046 m.) of p-methylthiobenzoyl chloride in 50 ml. of dimethylformamide is added dropwise over a period of 30 minutes. The mixture is stirred in an ice-bath for five hours under nitrogen. It is then poured into a mixture of 500 ml. of ether, 5 ml. of acetic acid and 1 liter of iced water. The organic products are extracted with 3× 300 ml. of ether. The ether solutions are combined and washed with a large quantity of water, and dried over sodium sulfate. The solution is filtered, evaporated to near dryness and the residue charged onto a 300 g. alumina column. The ethyl-2-(1-p-methylthiobenzoyl-2-methyl-5-methoxy-3-indolyl)-acrylate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for one hour. About 20 ml. of benzene is then added and boiled off. The remaining solution is centrifuged and diluted with petroleum ether. On cooling, the acid chloride separates, M.P. 40–44° C.

When methyl-$\alpha$-(2-methyl-5-methoxy-3-indolyl)-acrylate is employed as the starting material in the above process, there is obtained methyl-2-(1-p-methylthiobenzoyl-2-methyl-5-methoxy-3-indolyl)-acrylate.

EXAMPLE 2

The procedure of Example 1 is followed using the following aroyl and heteroaroyl chlorides in place of p-methylthiobenzoyl chloride: p-chlorobenzoyl chloride, 3,4,5-trimethoxybenzoyl chloride, p-phenoxybenzoyl chloride, p-trifluoroacetylbenzoyl chloride, p-N,N-dimethylsulfamylbenzoyl chloride, 3-furoyl chloride, 1-methylimidazol-5-carboxylic acid chloride, 1,3-dimethyl-2,3-dihydro-2-oxoimidazole-4-carboxylic acid chloride, 1-methylbenzimidazol-2-carboxy chloride, 5-fluoro-2-thenoyl chloride, 3-thenoyl chloride, 5-nitro-2-furoyl chloride, 1-methyl-indazole-3-carboxy chloride, 1-methyl-6-nitroindazole-3-carboxy chloride, oxazole-4-carboxy chloride, benzoxazole-2-carboxy chloride, thiazole-4-carboxy chloride, thiazole-2-carboxy chloride, 2-phenylthiazole-4-carboxy chloride, 2-benzylmercaptothiazole-4-carboxy chloride, p-acetylbenzoyl chloride, N,N-dimethyl-p-carboxamidobenzoyl chloride, p-cyanobenzoyl chloride, p-carbomethoxybenzoyl chloride, p-formylbenzoyl chloride, p-trifluoromethylthiobenzoyl chloride, N,N-dimethyl-p-sulfonamidobenzoyl chloride, p-methylsulfinylbenzoyl chloride, p-methylsulfonylbenzoyl chloride, p-benzylthiobenzoyl chloride, p-mercaptobenzoyl chloride, p-nitrobenzoyl chloride, p-dimethylaminobenzoyl chloride, p-acetaminobenzoyl chloride, o-fluoro-p-chlorobenzoyl chloride, o-methoxy-p-chlorobenzoyl chloride, o-hydroxy-p-chlorobenzoyl chloride, 2,4,5-trichlorobenzoyl chloride, to produce the corresponding N-1 aroyl and N-1 heteroaroyl derivatives of the ethyl-2-(1-p-methylthiobenzoyl-2-methyl-5-methoxy-3-indolyl)-acrylate.

EXAMPLE 3

A. The procedure of Example 1 is followed using the following alkyl bromides in place of methyl bromide; ethyl bromide, propyl bromide, butyl bromide, sec-butyl bromide and iso-propyl bromide to the following compounds: ethyl - 2 - (1 - p - methylthiobenzoyl-2-methyl-5-methoxy - 3 - indolyl)-crotonate, ethyl-2-(1-p-methylthiobenzoyl - 2 - methyl - 5-methoxy-3-indolyl)pent-2-enoate, ethyl - 2 - (1 - p - methylthiobenzoyl-2-methyl-5-methoxy-3-indolyl-hex-3-enoate, ethyl-2-(1-p-methylthiobenzoyl-2-methyl-5-methoxy-3-indolyl)-3-methyl-pent-2-enoate, and ethyl - 2 - (1-p-methylthiobenzoyl-2-methyl-5-methoxy-3-indolyl)-β-methyl-crotonate.

B. When the procedure of Example 1A(2) and B is followed using equivalent quantities of the bromomethylene, fluoromethylene, dichloromethylene, fluorochloromethylene, difluoromethylene, dibromomethylene and bromochloromethylene derivative of triphenylphosphorane [prepared according to the procedure of D. Seyferth et al. in J. Am. Chem. Soc. 82, 1511 (1960)] in place of the triphenylphosphorane compound prepared in Example 1A(1), there are obtained ethyl α-bromomethylenyl-α-(p-methylthiobenzoyl-2-methyl-5-methoxy-3-indolyl)-acetate,
ethyl α-fluoromethylenyl-α-(p-methylthiobenzoyl-2-methyl-5-methoxy-3-indolyl)-acetate,
ethyl α-dichloromethylenyl-α-(p-methylthiobenzoyl-2-methyl-5-methoxy-3-indolyl)-acetate,
ethyl α-fluorochloromethylenyl-α-(p-methylthiobenzoyl-2-methyl-5-methoxy-3-indolyl)-acetate,
ethyl α-difluoromethylenyl-α-(p-methylthiobenzoyl-2-methyl-5-methoxy-3-indolyl)-acetate,
ethyl α-dibromomethylenyl-α-(p-methylthiobenzoyl-2-methyl-5-methoxy-3-indolyl)-acetate, and
ethyl α-bromochloromethylenyl-α-(p-methylthiobenzoyl-2-methyl-5-methoxy-3-indolyl)-acetate respectively.

When the aroyl and hetero-aroyl chlorides of Example 2 are employed in place of p-methylthiobenzoyl chloride, there are produced the corresponding N-1 aroyl and N-1 hetero-aroyl derivatives of the above compounds.

EXAMPLE 4

The procedure of Example 1 is followed using the following substituted alkyl halides in place of methyl bromide: 3-chloropropyl bromide, 3-fluoropropyl bromide, 1,1,1-trifluoro-4-bromobutane, 3-methoxypropyl bromide, 3-methylthiopropyl bromide, and 3-dimethylaminopropyl bromide to produce the corresponding compounds:

ethyl-2-(1-p-methylthiobenzoyl-2-methyl-5-methoxy-3-indolyl)-5-chloro-pent-2-enoate;
ethyl-2-(1-p-methylthiobenzoyl-2-methyl-5-methoxy-3-indolyl)-5-fluoro-pent-2-enoate;
ethyl-2-(1-p-methylthiobenzoyl-2-methyl-5-methoxy-3-indolyl)-6,6,6-trifluorohex-2-enoate;
ethyl-2-(1-p-methylthiobenzoyl-2-methyl-5-methoxy-3-indolyl)-5-methoxy-pent-2-enoate;
ethyl-2-(1-p-methylthiobenzoyl-2-methyl-5-methoxy-3-indolyl)-5-methylthio-pent-2-enoate; and
ethyl-2-(1-p-methylthiobenzoyl-2-methyl-5-methoxy-3-indolyl)-5-dimethylamino-pent-2-enoate.

When the aroyl and heteroaroyl chlorides used in Example 2 are employed in place of p-methylthiobenzoyl chloride, there are produced the corresponding N-1 aroyl and N-1 heteroaroyl derivatives of the above compounds.

EXAMPLE 5

The procedure of Examples 1–4 are followed using equivalent quantities of the following starting materials in place of ethyl - α - (2 - methyl-5-methoxy-3-indolyl)-glyoxalate;

ethyl-α-(2-ethyl-5-methyl-3-indolyl)-glyoxalate;
ethyl-α-(2-methyl-5-trifluoro-methyl-3-indolyl)-glyoxalate;
ethyl-α-(2-allyl-5-benzyloxy-3-indolyl)-glyoxalate;
ethyl-α-(2-phenyl-5-methoxy-3-indolyl)-glyoxalate;
ethyl-α-(2-p-methoxy-phenyl-5-chloro-3-indolyl)-glyoxalate;
α-(2-methyl-5-fluoro-3-indolyl)-glyoxalamide;
ethyl-α-(2-cyclopropylmethyl-5-methyl-3-indolyl)-glyoxalate;
α-(2-p-chloro-phenyl-5-methoxy-3-indolyl)-glyoxalamide;
α-(5-methoxy-3-indolyl)-glyoxalamide;
ethyl-α-(5-benzyloxy-3-indolyl)-glyoxalate;
α-(2-methyl-5-allyloxy-3-indolyl)-glyoxalamide;
α-(5-ethoxy-3-indolyl)-glyoxalamide;
ethyl-α-(2-benzyl-5-methoxy-3-indolyl)-glyoxalate;
t-butyl-α-(5-benzyloxy-6-methyl-3-indolyl)-glyoxalate;
propyl-α-(6-methoxy-3-indolyl)-glyoxalate;
methyl-α-(2-methyl-5-nitro-6-fluoro-3-indolyl)-glyoxalate;
α-(5-benzyloxy-6-trifluoromethyl-3-indolyl)-glyoxalamide;
ethyl-α-(2-methyl-5-nitro-3-indolyl)-glyoxalate;
ethyl-α-(2-methyl-5-acetyl-3-indolyl)-glyoxalate;
ethyl-α-(2-methyl-5-butyryl-3-indolyl)-glyoxalate;
ethyl-α-(2-methyl-5-bis(benzyloxyethyl)amino-3-indolyl)-glyoxalate;
ethyl-α-(2-methyl-5-bis(benzyloxybutyl)amino-3-indolyl)-glyoxalate;
ethyl-α-(2-methyl-5-bis(benzyloxypentyl)amino-3-indolyl)-glyoxalate;
ethyl-α-2-methyl-5-(1-pyrrolidino)-3-indolyl)-glyoxalate;
ethyl-α-(2-methyl-5-(4-methyl-1-piperazinyl)-3-indolyl)-
ethyl-α-(2-methyl-5-(4-morpholinyl)-3-indolyl)-glyoxalate;
ethyl-α-(2-methyl-5-trifluoromethyl-3-indolyl)-glyoxalate;
ethyl-α-(2-methyl-5-chloro-3-indolyl)-glyoxalate;
ethyl-α-(2-methyl-5-bromo-3-indolyl)-glyoxalate;
ethyl-α-(2-methyl-5-fluoro-3-indolyl)-glyoxalate;
ethyl-α-(2-methyl-5-dimethylsulfamyl-3-indolyl)-glyoxalate;
ethyl-α-(2-methyl-5-dipropylsulfamyl-3-indolyl)-glyoxalate;
ethyl-α-(2-methyl-5-benzylthio-3-indolyl)-glyoxalate;
ethyl-α-(2-methyl-5-p-methylbenzylthio-3-indolyl)-glyoxalate;
ethyl-α-(2-methyl-5-p-propylbenzylthio-3-indolyl)-glyoxalate;
ethyl-α-(2-methyl-5-p-pentylbenzylthio-3-indolyl)-glyoxalate;
ethyl-α-(2-methyl-5-p-methoxybenzylthio-3-indolyl)-glyoxalate;
ethyl-α-(2-methyl-5-p-propoxybenzylthio-3-indolyl)-glyoxalate;
ethyl-α-(2-methyl-5-p-pentoxy-benzylthio-3-indolyl)-glyoxalate;
ethyl-α-(2-methyl-5-p-chlorobenzylthio-3-indolyl)-glyoxalate;
ethyl-α-(2-methyl-5-p-bromobenzylthio-3-indolyl)-glyoxalate;
ethyl-α-(2-methyl-5-p-fluorobenzylthio-3-indolyl)-glyoxalate;
ethyl-α-(2-methyl-5-benzyloxy-3-indolyl)-glyoxalate;
ethyl-α-(2-methyl-5-p-methylbenzyloxy-3-indolyl)-glyoxalate;
ethyl-α-(2-methyl-5-p-propylbenzyloxy-3-indolyl)-glyoxalate;
ethyl-α-(2-methyl-5-p-pentylbenzyloxy-3-indolyl)-glyoxalate;
ethyl-α-(2-methyl-5-p-methoxybenzyloxy-3-indolyl)-glyoxalate;
ethyl-α-(2-methyl-5-p-propoxybenzyloxy-3-indolyl)-glyoxalate;
ethyl-α-(2-methyl-5-p-pentyloxybenzyloxy-3-indolyl)-glyoxalate;

ethyl-α-(2-methyl-5-p-chlorobenzyloxy-3-indolyl)-
  glyoxalate;
ethyl-α-(2-methyl-5-bromobenzyloxy-3-indolyl)-
  glyoxalate;
ethyl-α-(2-methyl-5-p-fluorobenzyloxy-3-indolyl)-
  glyoxalate;
ethyl-α-(2-methyl-5-cyclopropylmethoxy-3-indolyl)-
  glyoxalate;
ethyl-α-(2-methyl-5-cyclopropylpropoxy-3-indolyl)-
  glyoxalate;
ethyl-α-(2-methyl-5-cyclopropylpentoxy-3-indolyl)-
  glyoxalate;
ethyl-α-(2-methyl-5-methyloxy-3-indolyl)-glyoxalate;
ethyl-α-(2-methyl-5-cyclobutylmethoxymethyloxy-3-
  indolyl)-glyoxalate;
ethyl-α-(2-methyl-5-cyclobutylpropoxymethyloxy-3-
  indolyl)-glyoxalate;
ethyl-α-(2-methyl-5-cyclobutylpentoxy-methyloxy-3-
  indolyl)-glyoxalate;
ethyl-α-(2-methyl-5-N,N-dimethylcarbamyl-3-indolyl)-
  glyoxalate; and
ethyl-α-(2-methyl-5-allyl-3-indolyl)-glyoxalate;

to produce the corresponding substituted final products.

EXAMPLE 6

When the aroyl and heteroaryl chlorides used in Example 2 are employed in place of p-methylthiobenzoyl chloride, there are produced the corresponding N-1 aroyl and N-1 heteroaroyl derivatives of the above compounds.

EXAMPLE 7

α-(1-p-chlorobenzoyl-2-methyl-5-methoxy-3-indolyl)-
  acrylic acid

A. α-(2-METHYL-5-METHOXY-3-INDOLYL)-ACRYLIC ANHYDRIDE

Dicyclohexylcarbodiimide (10 g.) is dissolved in a solution of α-(2-methyl-5-methoxy-3-indolyl)-acrylic acid (22 g.) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

B. t-BUTYL α-(2-METHYL-5-METHOXY-3-INDOLYL)-ACRYLATE t-Butyl alcohol (25 ml.) and fused zinc chloride (0.3 g.) are added to the anhydride from part A. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester (18 g., 93%) is used without purification.

C. t-BUTYL α-(1-p-CHLOROBENZOYL-2-METHYL-5-METHOXY-3-INDOLYL)-ACRYLATE

A stirred solution of ester (18 g. in dry DMF [450 ml.]) is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours with replenishing the ice bath. The mixture is then poured into 1 liter of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue (17 g.) which solidifies after being refrigerated overnight. The crude product is boiled with 300 ml. of Skellysolve B, cooled to room temperature, decanted from some gummy material, treated with charcoal, concentrated to 100 ml., and allowed to crystallize. The product thus obtained (10 g.) is recrystallized from 50 ml. of methanol and gives 4.5 g. of analytically pure material.

D

A mixture of 1 g. ester and 0.1 g. powdered porous plate is heated in an oil bath at 210° with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product (0.4 g., 47%) is recrystallized from aqueous ethanol and dried in vacuo at 65°.

EXAMPLE 8

Ethyl-α-(1-p-methylthiobenzoyl-2-methyl-5-methoxy-
  3-indolyl)-α-allyl acetate

A. ETHYL α-ETHOXY OXALYL-α-(2-METHYL-5-METHOXY-3-INDOLYL)-ACETATE

To a solution of 2.3 g. of sodium in 200 ml. of dry ethanol is added 0.15 mole of diethyl oxalate and 0.1 mole of ethyl 2-methyl-5-methoxy-3-indolyl acetate. The mixture is refluxed gently on a steam bath for 2 hours and then cooled to room temperature. After dilution with 800 ml. of ether the precipitate is collected on a filter, washed with ether and dissolved in dilute sulfuric acid (1 N). The aqueous solution is extracted with three 100 ml. portions of ether. The ethereal solution is dried over sodium sulfate and evaporated to obtain the product.

B. DIETHYL 2-METHYL-5-METHOXY-3-INDOLYL MALONATE

The above glyoxalate is heated in an oil bath at 150–200° in the presence of powdered glass under nitrogen until the evolution of carbon monoxide is complete. The residual oil is purified by chromatography in a silica gel column using ether-pet-ether (v./v. 50–100%) as eluent to obtain the product.

C. DIETHYL ALLYL-(2-METHYL-5-METHOXY-3-INDOLYL)-MALONATE

To a solution of 0.11 mole of sodium ethoxide and 0.1 mole of the above malonate in 300 ml. of dry ethanol is added dropwise 0.11 mole of allyl bromide with stirring. The mixture is then stirred at room temperature until neutral to phenolphthalein. The solution is concentrated in vacuo to about 100 ml., poured into water and extracted with ether. The ethereal solution is dried over sodium sulfate, evaporated and chromatographed on a silica gel column using ether-pet-ether (v./v. 20–60%) as eluent.

D. α-(2-METHYL-5-METHOXY-3-INDOLYL)-α-ALLYL ACETIC ACID

The above malonate (0.05 mole) is dissolved in 150 ml. 90% aqueous ethanol containing 0.2 mole of sodium hydroxide and the solution is allowed to stand at room temperature for 18 hours. The solution is diluted with 100 ml. water, concentrated in vacuo to about 150 ml., poured into water, acidified with dilute sulfuric acid and warmed in a steam bath until the evolution of carbon dioxide is complete. The solution is cooled and extracted with ether. After drying over sodium sulfate, the ethereal solution is evaporated to obtain the product.

E. METHYL α-(2-METHYL-5-METHOXY-3-INDOLYL)-α-ALLYL ACETATE

The above acid is converted to its methyl ester by the treatment of 5% sulfuric acid in methanol at reflux temperature for 1 hour.

F

The procedure of Example 1C is followed using equivalent quantities of the above ester and p-methylthiobenzoyl chloride to produce the desired N-aroyl product.

EXAMPLE 9

The procedure of Example 8 is followed using equivalent quantities of the following alkenyl and alkynyl bromides: methallyl bromide, crotyl bromide, propargyl bromide, 4-methoxycrotyl bromide, 4-methoxythiocrotyl bromide and 4-trifluoromethylcrotyl bromide is place of allyl bromide to produce the corresponding α-alkenyl and α-alkynyl substituted compounds.

EXAMPLE 10

The procedure of Example 8 is followed using equivalent quantities of the acyl halides of Example 2 in place of p-methylthiobenzoyl chloride to produce the corresponding N-1 aroyl and N-1 heteroaroyl α-alkenyl and α-alkynyl substituted compounds.

EXAMPLE 11

The procedure of Example 7 is followed using equivalent quantities of the corresponding α-alkenyl and α-alkynyl acetic acids as produced in Example 8E to provide the corresponding N-1 aroyl and N-1 heteroaroyl α-alkenyl and α-alkynyl acetic acid compounds.

EXAMPLE 12

*Methyl-(1-p-chlorobenzoyl-2-methyl-5-dimethylamino-3-indolyl)-acrylate*

A. METHYL-(1-p-CHLOROBENZOYL-2-METHYL-5-DIMETHYLAMINO-3-INDOLYL) GLYOXALATE

To a solution of 0.387 g. of methyl-α-(1-p-chlorobenzoyl-2-methyl-5-nitro-3-indolyl) glyoxalate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil.

B

The procedure of Example 1A is followed to provide the desired product.

EXAMPLE 13

A. *Preparation of tertiary-butyl (1-p-chlorobenzoyl-2-methyl-5-methoxy-3-indolyl) glyoxalate*

1. 2-METHYL-5-METHOXY-3-INDOLEGLYOXALYL CHLORIDE

To a solution of 25 grams of 2-methyl-5-methoxyindole in 500 ml. of anhydrous ether are added 25 ml. of oxalyl chloride. The solution is allowed to stand for 24 hours and the resulting solid, 2-methyl-5-methoxy-3-indoleglyoxalyl chloride, is collected, washed with dry ether, and dried under reduced pressure.

2. t-BUTYL (2-METHYL-5-METHOXY-3-INDOLYL) GLYOXALATE 30 grams of product (1) is then treated with a stoichiometric amount of triethylamine in 200 ml. of tertiary-butanol at 10° C. for four hours to yield tertiary-butyl (2-methyl-5-methoxy-3-indolyl) glyoxalate.

3. TERTIARY-BUTYL (1-p-CHLOROBENZOYL-2-METHYL-5-METHOXY-3-INDOLYL) GLYOXALATE

Product (2) is then collected and acylated with p-chlorobenzoylchloride according to the process outlined in Example 1B to yield tertiary-butyl (1-p-chlorobenzoyl-2-methyl-5-methoxy-3-indolyl) glyoxalate.

B

In accordance with the above procedure, but substituting an equivalent quantity of methanol, ethanol, isopropanol and benzylalcohol respectively, for the tertiary-butanol used therein, the corresponding methyl, ethyl, isopropyl and benzyl glyoxalates are obtained, respectively.

EXAMPLE 14

A. The procedure of Example 13A is followed using p-methylthiobenzoyl chloride, 3,4,5-trimethoxybenzoyl chloride, p-phenoxybenzoyl chloride, p-trifluoroacetylbenzoyl chloride, p-N,N-dimethylsulfamylbenzoyl chloride, 3 - furoyl chloride, 1 - methyl - imidazol - 5 - carboxylic acid chloride, 1,3-dimethyl-2,3-dihydro-2-oxoimidazole - 4 - carboxylic acid chloride, 1 - methylbenzimidazol-2-carboxy chloride, 5-fluoro-2-thenoyl chloride, 3-thenoyl chloride, 5-nitro-2-furoyl chloride, 1-methyl-indazole-3-carboxy chloride, 1-methyl-6-nitroindazole-3-carboxy chloride, oxazole-4-carboxy chloride, benzoxazole-2-carboxy chloride, thiazole-4-carboxy chloride, thiazole-2-carboxy chloride, 2-phenylthiazole-4-carboxy chloride, 2-benzylmercaptothiazole - 4 - carboxy chloride, p - acetylbenzoyl chloride, N,N-dimethyl-p-carboxamidobenzoyl chloride, p-cyanobenzoyl chloride, p-carbomethoxybenzoyl chloride, p-formylbenzoyl chloride, p-trifluoromethylthiobenzoyl chloride, N,N-dimethyl-p-sulfonamidobenzoyl chloride, p-methylsulfinylbenzoyl chloride, p-methylsulfonylbenzoyl chloride, p-benzylthiobenzoyl chloride, p-nitrobenzoyl chloride, p-dimethylaminobenzoyl chloride, p-acetaminobenzoyl chloride, o-fluoro-p-chlorobenzoyl chloride, o-methoxy-p-chlorobenzoyl chloride, o-benzyloxy-p-chlorobenzoyl chloride, 2,4,5-trichlorobenzoyl chloride, in place of 1-p-chlorobenzoyl chloride, to produce the corresponding N-1 aroyl and N-1 hetero-aroyl derivatives of tertiary-butyl-(1-p-chlorobenzoyl-2-methyl-5-methoxy-3-indolyl)-glyoxalate.

B. In like manner, the methyl, ethyl, isopropyl and benzyl glyoxalates of the various N-1 aroyl or hetero-aroyl substituted indole compounds indicated above are prepared from the corresponding alcohols of Example 13B.

EXAMPLE 15

A. *Preparation of tertiary butyl α-chloromethylenyl-α-(1 - p - chlorobenzoyl - 2 - methyl - 5 - methoxy - 3-indolyl) acetate*

A solution of 0.05 mole of t-butyl-(1-p-chlorobenzoyl-2-methyl-5-methoxy-3-indolyl) glyoxalate in 300 ml. dry ether is treated with 0.05 mole of chloromethylene triphenylphosphorane [prepared according to the procedure of D. Seyferth et al. in J. Am. Chem. Soc. 82, 1511 (1960)], at the reflux temperature for 4 hours. The solution is concentrated in vacuo to a syrup and then chromatographed on a 600 g. silica gel column using ether-petroleum ether (v./v., 25–100%) as eluent to give the corresponding α-chloromethylenyl ester.

B

The procedure of paragraph 15A is followed using equivalent quantities of the bromomethylene, fluoromethylene, dichloromethylene, fluorochloromethylene, difluoromethylene, dibromomethylene and bromochloromethylene derivatives of triphenylphosphorane, respectively, in place of the chloromethylene triphenylphosphorane used therein, to obtain the corresponding α-halogenated methylenyl indolyl esters.

C

In like manner, equivalent quantities of the halogenated methylene triphenylphosphoranes of Examples 15A and 15B and the methyl, ethyl, isopropyl, benzyl and tertiary-butyl glyoxalates of Example 14, respectively, are reacted together by the procedure of Example 15A to yield the respective corresponding α-halogenated methylenyl indolyl esters.

EXAMPLE 16

A. *Preparation of α-chloromethylenyl-α-(1-p-chlorobenzoyl-2-methyl-5-methoxy-3-indolyl) acetic acid*

The tertiary butyl-α-chloromethylenyl-α-(1-p-chlorobenzoyl-2-methoxy-3-indolyl) acetate of Examples 15A is treated with 5% para-toluenesulfonic acid in benzene at the reflux temperature for 1 hour to give the corresponding α-chloromethylenyl acetic acid.

B

The procedure of Example 16A is followed using equivalent quantities of the tertiary butyl α-halogenated methylenyl esters of Examples 15B and 15C to yield the corresponding a-halogenated methylenyl indolyl acetic acids.

EXAMPLE 17

A. *Preparation of α-chloromethylenyl-α-(1-p-chlorobenzoyl-2-methyl-5-methoxy-3-indolyl) acetic acid*

A solution of 5 g. of methyl α-chloromethylenyl-α-(1-p-chlorobenzoyl-2-methyl-5-methoxy-3-indolyl) acetate in 80 ml. of 80% aqueous dioxane and 20 ml. of 2.5 N hydrochloric acid is maintained at 30–50° C. for several hours under a nitrogen atmosphere. The reaction mixture is concentrated in vacuo to about 40 ml., diluted with water and extracted with ether. The ethereal solution is washed with water, dried over sodium sulfate, filtered and evaporated to nearly dryness. The mixture is chromatographed on 200 g. of silica gel using a mixture of ether in petroleum ether (v./v. 30–100%) as eluent to yield α-chloromethylenyl-α-(1 - p - chlorobenzoyl - 2 - methyl-5-methoxy-3-indolyl) acetic acid.

B

The procedure of Example 17A is followed using equivalent quantities of the esters of Examples 3B, 15B and 15C in place of the indolyl acid ester above to yield the corresponding α-halogenated methylenyl indolyl acetic acids.

EXAMPLE 18

A. *Preparation of isobutyric-α-chloromethylenyl-α-(1-p-chlorobenzoyl - 2 - methyl-5-methoxy-3-indolyl) acetic acid anhydride*

A solution of 0.01 mole of α-chloromethylenyl-α-(1-p-chlorobenzoyl-2-methyl-5-methoxy-3-indolyl) acetic acid in 100 ml. of dimethoxyethane is treated with 0.01 mole of triethylamine with ice-cooling and stirring. After one hour, 0.011 mole of isobutyl chloroformate is added dropwise and the mixture is stirred at 0–5° C. for 4–8 hours. The solution is filtered to remove precipitated triethylamine hydrochloride and evaporated in vacuo to give a concentrated solution of the mixed anhydride.

B

The procedure of Example 18A is followed using equivalent quantities of the indolyl acids produced by Example 17B in place of the above acid to yield the correspondingly substituted α-halogenated methylenyl indolyl acetic acid isobutyric mixed anhydrides.

C

The procedure of Examples 18A and 18B is followed using equivalent quantities of the following chloroformate esters in place of isobutyl chloroformate, to give the corresponding mixed anhydrides: ethyl chloroformate, n-propyl chloroformate, phenyl chloroformate, p-nitrophenyl chloroformate, and methyl chloroformate.

EXAMPLE 19

A. *Preparation of α-chloromethylenyl-α-(1-p-chlorobenzoyl-2-methyl-5-methoxy-3-indoyl) acetyl morpholide*

Equivalent amounts of isobutyric-α-chloromethylenyl-α-(1-p-chlorobenzoyl - 2 - methyl-5-methoxy-3-indolyl) acetic acid anhydride and morpholine are reacted at 0–5° C. to give the corresponding α-chloromethylenyl-α-(1-p-chlorobenzoyl - 2 - methyl - 5 - methoxy-3-indolyl) acetyl morpholide.

B

The procedure of Example 19A is followed using equivalent quantities of the α-halogenated methylenyl indolyl acid mixed anhydrides of Examples 18B and 18C in place of the above acid anhydrides, to give the correspondingly substituted morpholides.

C

The procedures of Examples 19A and 19B are followed using equivalent quantities of the following amines in place of the morpholine, to give the corresponding amides: ammonia, methylamine, isopropylamine, diethanolamine, aniline, methylaniline, benzylamine, p-chloraniline, β-methoxyethylamine, p-tolylamine, and p-methoxyaniline. Volatile amines such as ammonia and methylamine are bubbled through the reaction mixture.

EXAMPLE 20

A. *Preparation of diethylaminoethyl-α-chloromethylenyl-α-(1-p-chlorobenzoyl - 2 - methyl-5-methoxy-3-indolyl) acetate*

Equivalent amounts of isobutyric-α-chloromethylenyl-α-(1-p-chlorobenzoyl-2-methyl - 5 - methoxy-3-indolyl) acetic acid anhydride and β-diethylaminoethanol are reacted at 0–5° C. to give the corresponding diethylaminoethyl-α-chloromethylenyl - α - (1 - p - chlorobenzoyl-2-methyl-5-methoxy-3-indolyl) acetate.

B

The procedure of Example 20A is followed using equivalent quantities of the mixed anhydrides prepared in Examples 18B and 18C in place of the above anhydride to form the corresponding substituted diethylaminoethyl esters.

C

The procedures of Examples 20A and 20B are followed using equivalent quantities of the following alcohols to give the corresponding esters of the respective α-halogenated methylenyl indolyl acids: methanol, ethanol, t-butanol, benzylalcohol, and β-phenylethylalcohol.

EXAMPLE 21

A. *Preparation of sodium α-chloromethylenyl-α-(1-p-methylthiobenzoyl - 2 - methyl - 5 - methoxy-3-indolyl) acetate*

To a solution of 0.01 mole of α-chloromethylenyl-α-(1-p-chlorobenzoyl-2-methyl - 5 - methoxy-3-indolyl) acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

B

The procedure of Example 21A is followed using equivalent quantities of the indolyl acids produced in Examples 16 and 17 to give corresponding sodium salts. Similarly, when equivalent quantities of potassium ethoxide, calcium hydroxide or aluminum isopropoxide are used the corresponding metal salts are obtained.

C

The procedure of Example 17 is followed using equivalent quantities of the acids of Examples 22 and 23 in place of the α-halomethylindolyl acids of Example 17 to obtain the corresponding organic amine salts.

EXAMPLE 22

*Ethyl-(1-p-methylthiobenzoyl-2-methyl-5-methoxy-3-indolyl)-glyoxalate*

A. ETHYL-(2-METHYL-5-METHOXY-3-INDOLYL)-GLYOXALATE (1) *2-methyl-5-methoxy-3-indoleglyoxalyl chloride.*—To a solution of 0.21 mole of 2-methyl-5-methoxyindole and 500 mls. of anhydrous ether is added 0.23 mole of oxalyl chloride. After standing overnight, the solid material which has settled is collected, washed with dry ether, and dried under reduced pressure.

(2) A solution of 0.1 mole of 2-methyl-5-methoxy-3-indoleglyoxalyl chloride (obtained from Step 1) in 200 ml. of ethanol is stirred at room temperature for one hour. The reaction mixture is concentrated to dryness in vacuo. The crude product obtained is ethyl-(2-methyl-5-methoxy-3-indolyl)-glyoxalate.

B

A solution of 0.1 mole of ethyl-(2-methyl-5-methoxy-3-indolyl)-glyoxalate is acylated according to Example 1B to yield ethyl-(1-p-methylthiobenzoyl-2-methyl-5-methoxy-3-indolyl)-glyoxalate.

C

When the aroyl and heteroaroyl chlorides of Example 2 are used in place of p-methylthiobenzoyl chloride in Example 22B, there are obtained the corresponding ethyl-(1 - acylsubstituted - 2 - methyl - 5 - methoxy - 3 - indolyl)-glyoxalates.

EXAMPLE 23

*N-methyl-(1-p-methylthiobenzoyl-2-methyl-5-methoxy-3-indolyl)-glyoxalamide*

A. N-METHYL-(2-METHYL-5-METHOXY-3-INDOLE-GLYOXALYL)-AMIDE

Gaseous methylamine is passed into a solution of 0.1 mole of 2-methyl-5-methoxy-3-indoleglyoxalyl chloride (obtained from Example 22) in 200 ml. of 1,2-dimethoxyethane. After 2 hours, the solution is evaporated in vacuo. The residue is placed in a mixture of chloroform and water. The chloroform layer is dried over sodium sulfate and evaporated under vacuo to give N-methyl-(2-methyl-5-methoxy-3-indoleglyoxalyl)-amide.

B 0.1 mole of U-methyl-(2-methyl-5-methoxy-3-indoleglyoxalyl)-amide is acylated according to the procedure in Example 1B to yield N-methyl-(1-p-methylthiobenzoyl-2-methyl-5-methoxy-3-indolyl)-glyoxalamide.

C

When the aroyl and heteroaroyl chlorides of Example 2 are used in place of p-methylthiobenzoyl chloride in the above example, there are obtained the corresponding N-methyl - (1 - acylsubstituted - 2 - methyl - 5 - methoxy - 3-indolyl)-glyoxalamides.

EXAMPLE 24

*(1-p-methylthiobenzoyl-2-methyl-5-methoxy-3-indolyl)-glyoxalic acid*

A. 1-p-METHYLTHIOBENZOYL-2-METHYL-5-METHOXY INDOLE 0.1 mole of 2-methyl-5-methoxy indole is acylated in accordance with the procedure of Example 1B to yield 1-p-methylthiobenzoyl-2-methyl-5-methoxy indole.

B. 1-p-METHYLTHIOBENZOYL-2-METHYL-5-METHOXY-3-INDOLEGLYOXALYL CHLORIDE

The product of Step A is treated in accordance with the procedure of Example 22A(1) to yield 1-p-methylthiobenzoyl - 2 - methyl - 5 - methoxy - 3 - indoleglyoxalyl chloride.

C 0.20 mole of product B is placed in 200 ml. of chloroform and the solution stirred. To this solution is added (gradually with caution) 0.20 mole NaHCO₃ in water and the reaction mixture is stirred for an additional hour. The chloroform layer is separated and concentrated in vacuo to yield (1-p-methylthiobenzoyl-2-methyl-5-methoxy-3-indolyl)-glyoxalic acid.

D

When the aroyl and heteroaroyl chlorides of Example 2 are employed in place of p-methylthiobenzoyl chloride in Example 24A, there are obtained the corresponding 1-acylsubstituted-2-methyl-5-methoxy indoles.

EXAMPLE 25

*Sodium-(1-p-methylthiobenzoyl-2-methyl-5-methoxy-3-indolyl)-glyoxalate*

A. SODIUM-(2-METHYL-5-METHOXY-3-INDOLYL)-GLYOXALATE 0.10 mole of dilute aqueous sodium hydroxide is cautiously added to a solution of 0.10 mole of 2-methyl-5-methoxy-3-indole glyoxalic acid (obtained from Example 24C) in 200 ml. of tetrahydrofuran. After one hour the stirred mixture is concentrated in vacuo to yield a crude sodium salt of 2-methyl-5-methoxy-3-indole glyoxalic acid.

B 0.10 mole of sodium-(2-methyl-5-methoxy-3-indolyl)-glyoxalate is acylated in accordance with the procedure of Example 1B to yield sodium-(1-p-methylthiobenzoyl-2-methyl-5-methoxy-3-indolyl)-glyoxalate. (A crude mixture of the product and a mixed anhydride are formed.)

C

When the aroyl and heteroaroyl chlorides of Example 2 are employed in place of p-methylthiobenzoyl chloride in Example 25B, there are obtained the corresponding sodium-(1 - acylsubstituted - 2 - methyl - 5 - methoxy - 3-indolyl)-glyoxalates.

D

When potassium hydroxide is used in place of sodium hydroxide in the above example, the final glyoxalate is the potassium salt.

EXAMPLE 26

*Ethyl-(2-p-methylthiobenzoyl-2-methyl-5-methoxy-3-indolyl)-acrylate*

The produce of Example 1A is employed using ethyl-(1 - p - methylthiobenzoyl - 2 - methyl - 5 - methoxy - 3-indolyl)-glyoxalate in place of ethyl-(2-methyl-5-methoxy-3-indolyl)-glyoxalate to obtain ethyl-(2-p-methylthiobenzoyl-2-methyl-5-methoxy-3-indolyl)-acrylate.

EXAMPLE 27

The procedure of Example 15A is employed using the glyoxalamides, glyoxalic acids and alkali glyoxalates of Examples 23, 24, and 25 respectively in place of t-butyl-(1 - p - chlorobenzoyl - 2 - methyl - 5 - methoxy - 3 - indolyl)-glyoxalate, to obtain the corresponding α-chloromethylenyl acetamides, acetic acids and alkali acetates.

I claim:

1. A compound of the structural formula:

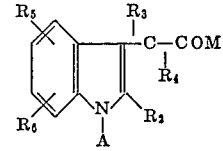

in which:

A is selected from the group consisting of benzoyl, naphthoyl, biphenoyl, and substituted benzoyl, naphthoyl and biphenoyl wherein said substituents are selected from the group consisting of lower alkylthio, lower alkoxy, phenoxy, dilower alkylsulfamyl, trifluoromethylthio, lower alkanoyl, carbomethoxy, halo, cyano, benzylthio, nitro, mercapto, lower alkylsulfonyl, lower alkylsulfinyl, dilower alkylamino, hydroxy;

$R_2$ is selected from the group consisting of hydrogen, lower alkyl, lower alkenyl, phenyl, phenyl(lower alkyl), chlorophenyl and methoxyphenyl;

$R_3$ is selected from the group consisting of lower alkenyl and lower alkynyl, wherein $R_4$ is hydrogen; and the same substituted with a member selected from the group consisting of halo, lower alkoxy, lower alkylthio and di(lower alkyl)amino;

$R_3$ and $R_4$ taken together are selected from the group consisting of methylene and methylene substituted with a member selected from the group consisting of lower alkyl, monohalo, dihalo, halo lower alkyl, lower alkoxyalkyl, lower alkylthioalkyl and di(lower alkyl)amino lower alkyl;

$R_5$ is selected from the group consisting of hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperizinyl, 4-morpholinyl, cyano, amino lower alkyl, trifluoromethyl, halogen, di(lower alkyl)sulfamyl, benzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropylmethyloxy or cyclobutylmethyloxy;

$R_6$ is selected from the group consisting of hydrogen, lower alkyl, lower alkoxy, fluorine and trifluoromethyl; and M is selected from the group consisting of hydroxy, amino, lower alkoxy, lower alkoxy lower alkoxy, phenyl lower alkoxy, cycloalkoxy, lower alkenoxy and OY wherein Y is selected from the group consisting of alkali metal, alkaline earth metal, aluminum, magnesium and

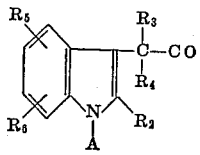

where $R_2$, $R_3$, $R_4$, $R_5$, $R_6$ and A are as defined above.

2. A compound of the formula:

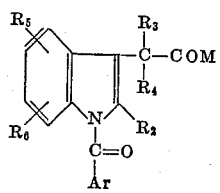

where:

Ar is selected from the group consisting of benzene, naphthalene, biphenyl and substituted benzene, naphthalene and biphenyl, wherein said substituent is selected from the group consisting of lower alkylthio, lower alkoxy, phenoxy, dilower alkylsulfamyl, trifluoromethylthio, lower alkanoyl, carbomethoxy, halo, cyano, benzylthio, nitro, mercapto, lower alkylsulfonyl, lower alkylsulfinyl, dilower alkylamino, hydroxy; and $R_2$, $R_3$, $R_4$, $R_5$, $R_6$ and M are as defined in claim 1.

3. A compound of claim 1 in which $R_2$ is lower alkyl, $R_3$ is lower alkenyl, $R_4$ is hydrogen, $R_5$ is lower alkoxy, $R_6$ is hydrogen, M is hydroxyl, and A is halobenzoyl.

4. A compound of claim 1 in which $R_2$ is lower alkyl, $R_3$ and $R_4$ taken together is methylene, $R_5$ is dimethylamino, $R_6$ is hydrogen, M is hydroxyl, and A is halobenzoyl.

5. A compound of claim 1 in which $R_2$ is a lower alkyl, $R_3$ and $R_4$ taken together is halomethylene, $R_5$ is lower alkoxy, $R_6$ is hydrogen, M is hydroxy and A is halobenzoyl.

6. A compound of claim 1 in which $R_2$ is a lower alkyl, $R_3$ and $R_4$ taken together is dihalomethylene, $R_5$ is lower alkoxy, $R_6$ is hydrogen, M is hydroxy and A is halobenzoyl.

7. A compound of claim 1 in which $R_2$ is a lower alkyl, $R_3$ and $R_4$ taken together is halomethylene, $R_5$ is dimethylamino, $R_6$ is hydrogen, M is hydroxy and A is halobenzoyl.

8. A compound of claim 1 in which $R_2$ is a lower alkyl, $R_3$ and $R_4$ taken together is dihalomethylene, $R_5$ is dimethylamino, $R_6$ is hydrogen, M is hydroxy and A is halobenzoyl.

9. $\alpha$ - (1 - p - methylthiobenzoyl - 2 - methyl - 5 - methoxy-3-indolyl)-acrylic acid.

10. $\alpha$ - (1 - p - chlorobenzoyl - 2 - methyl - 5 - methoxy-3-indolyl)-acrylic acid.

11. $\alpha$ - (1 - p - chlorobenzoyl - 2 - methyl - 5 - methoxy-3-indolyl)-$\alpha$-allyl acetic acid.

12. $\alpha$ - (1 - p - chlorobenzoyl - 2 - methyl - 5 - dimethylamino-3-indolyl)-crotonic acid.

13. $\alpha$ - (1 - p - chlorobenzoyl - 2 - methyl - 5 - dimethylamino-3-indolyl)-$\alpha$-allyl acetic acid.

14. $\alpha$ - Chloromethylenyl - $\alpha$ - (1 - p - chlorobenzoyl-2-methyl-5-methoxy-3-indolyl)-acetic acid.

15. $\alpha$ - Dichloromethylenyl - $\alpha$ - (1 - p - methylthiobenzoyl-2-methyl-5-methoxy-3-indolyl)-acetic acid.

16. A compound of the formula:

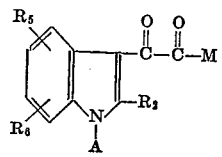

in which:

A is selected from the group consisting of benzoyl, naphthoyl, biphenoyl, and substituted benzoyl, naphthoyl and biphenoyl wherein said substituents are selected from the group consisting of lower alkylthio, lower alkoxy, phenoxy, dilower alkylsulfamyl, trifluoromethylthio, lower alkanoyl, carbomethoxy, halo, cyano, benzylthio, nitro, mercapto, lower alkylsulfonyl, lower alkylsulfinyl, dilower alkylamino and hydroxy;

$R_2$ is selected from the group consisting of hydrogen, lower alkyl, lower alkenyl, phenyl, phenyl(lower alkyl), chlorophenyl, and methoxyphenyl;

$R_5$ is selected from the group consisting of hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperizinyl, 4-morpholinyl, cyano, amino lower alkyl, trifluoromethyl, halogen, di(lower alkyl)sulfamyl, benzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropylmethyloxy or cyclobutylmethyloxy;

$R_6$ is selected from the group consisting of hydrogen, lower alkyl, lower alkoxy, fluorine and trifluoromethyl; and M is selected from the group consisting of hydroxy, amino, lower alkoxy, lower alkoxy lower alkoxy, phenyl lower alkoxy, cycloalkoxy, lower alkenoxy, and OY where Y is selected from the group consisting of alkali metal, alkaline earth metal, aluminum, and magnesium.

No references cited.

ALEX MAZEL, *Primary Examiner*.
NICHOLAS S. RIZZO, *Examiner*.
M. O'BRIEN, *Assistant Examiner*.